United States Patent
Woodman et al.

(10) Patent No.: US 6,195,624 B1
(45) Date of Patent: Feb. 27, 2001

(54) CORROSION ANALYSIS SYSTEM AND METHOD

(75) Inventors: Brian Wilder Woodman, Bloomfield; John F. Hall, Avon, both of CT (US)

(73) Assignee: Combustion Engineering, Inc., Windsor, CT (US)

( * ) Notice: Subject to any disclaimer, the term of this patent is extended or adjusted under 35 U.S.C. 154(b) by 0 days.

(21) Appl. No.: 08/389,545

(22) Filed: Feb. 15, 1995

Related U.S. Application Data

(63) Continuation of application No. 08/077,826, filed on Jun. 15, 1993, now abandoned.

(51) Int. Cl.$^7$ .............................. G06G 7/48; G06F 7/60

(52) U.S. Cl. ................................. 703/7; 703/2; 702/34; 73/598; 706/920

(58) Field of Search ...................... 395/911, 914, 395/920; 364/578, 551.01, 507; 73/598; 703/2, 7; 702/34; 706/911, 914, 920

(56) References Cited

U.S. PATENT DOCUMENTS

| | | | |
|---|---|---|---|
| 3,903,403 | * 9/1975 | Ferguson et al. | 364/578 |
| 4,213,183 | * 7/1980 | Barron et al. | 364/507 |
| 4,671,097 | * 6/1987 | Kurki et al. | 73/3 |
| 4,763,274 | * 8/1988 | Junker et al. | 364/481 |
| 4,801,421 | * 1/1989 | Ackerson et al. | 376/249 |
| 4,953,147 | * 8/1990 | Cobb | 73/598 |
| 4,965,743 | * 10/1990 | Malin et al. | 364/578 |
| 5,025,392 | * 6/1991 | Singh | 364/507 |
| 5,050,108 | * 9/1991 | Clark et al. | 364/557 |
| 5,214,577 | * 5/1993 | Sztipanovits et al. | 364/578 |
| 5,234,601 | * 8/1993 | Janke et al. | 364/502 |
| 5,331,579 | * 7/1994 | Maguire, Jr. et al. | 364/578 |

OTHER PUBLICATIONS

Nuclear Technology vo. 98, May 1992, US pp. 171–177, Mavko et al "Failure Probability of Axially Cracked Steam Generator Tubes: A Probabilistic Fracture Mechanics Model".

Contribution of Materials Investigation to the Resolution of Problems Encountered in PWR Plants International Symposium Fontevraud II France, Sep. 10, 1990, pp. 303–312.

Hernalstein "Statistical Treatment of Non Destructive Testing of Stream Generator Tubes to Modelize their Future Behavior".

(List continued on next page.)

Primary Examiner—Eric B. Stamber
(74) Attorney, Agent, or Firm—Alix, Yale & Ristas, LLP

(57) ABSTRACT

A system (10) and method (42,44,46,48,52,54) for generating an index (38,132,40,134) commensurate with the degree to which a tube array degrades over a period of time due to corrosion in a particular operating environment. A data array (62,114) is created defining the number of tubes in the tube array, a plurality of time points defining time intervals during which the degradation is to be assessed, and operating conditions that induce corrosion during each time interval. The expected degradation value of the array is computed over each of a plurality of time points using a deterministic failure model (88) having at least one parameter (102,104, 106) that is assumed constant at each time point. For each time point and at least one parameter, a plurality of values of the parameter (108,110) that deviate from the assumed constant value, are generated. For each time point, a plurality of degradation values are computed using the deterministic model with each of the plurality of deviated values of the parameter, thereby defining a distribution (34) of degradation values at the time point surrounding the expected degradation value (36,130) at the time point. An index (38,132,40,134) is generated from the distribution of values, commensurate with the uncertainty at each time point, in the expected degradation value (36,130) as computed by the deterministic model.

10 Claims, 8 Drawing Sheets

OTHER PUBLICATIONS

Proceedings of the 1993 Simulation Multiconference on the High Performance Computing Symposium, Mar. 29, 1993, Arlington, US, pp. 76–81, Chexal et al.

Proceedings of the U.S. Nuclear Regulatory Commission Water Reactor Safety Information Meeting, Oct. 23, 1989, Rockville US, pp. 411–431, Shah et al.

* cited by examiner

Fig. 8

Tube Failure Modes — 88

File  Return  OK  Input

Number of Failure Modes: 1

Failure Mode Description Input

Failure Mode Description: Failure Mode 1 — 91

Failure Mode Number: 1 — 90

Number of Tubes Affected by Failure Mode: 1000 — 92

Activation Energy [KCals/Mole Deg K]: 50 — 94

Probability of Detection by NDE — 96

Fraction of Defects Requiring Plugging — 98

Fraction of Defects Leaking: 0 — 100

Scale Parameter: 30 — 104

Shape Parameter: 1 — 102

Location Parameter: 0 — 106

Standard Deviation in Scale Parameter: 0 — 108

Standand Deviation in Shape Parameter: 0 — 110

☒ Include Failure Mode in Analysis? — 112

Simulation Scenario

| | | | | | |
|---|---|---|---|---|---|
| File | Return | OK | Input | | |

- 100 — Number of Simulation Trials
- 10 — Number of Fuel Cycles to Simulate
- Default SG Projection Simulation — Simulation Case Title
- input data here
- ENTER Plant Operating Scenario

| Cycle ID | Length Years | Capacity | Op Temp (F) | % inspect |
|---|---|---|---|---|
| Period 1 | 1 | 1.5 | .8 | 600 | 1 |
| Period 2 | 2 | 1.5 | .8 | 600 | 1 |
| Period 3 | 3 | 1.5 | .8 | 600 | 1 |
| Period 4 | 4 | 1.5 | .8 | 600 | 1 |
| Period 5 | 5 | 1.5 | .8 | 600 | 1 |
| Period 6 | 6 | 1.5 | .8 | 600 | 1 |
| Period 7 | 7 | 1.5 | .8 | 600 | 1 |
| Period 8 | 8 | 1.5 | .8 | 600 | 1 |
| Period 9 | 9 | 1.5 | .8 | 600 | 1 |
| Period 10 | 10 | 1.5 | .8 | 600 | 1 |

Fig. 9

CORROSION ANALYSIS SYSTEM AND METHOD

This is a continuation of application Ser. No. 08/077,826 filed on Jun. 15, 1993 now abandoned.

BACKGROUND OF THE INVENTION

The present invention relates to the assessment of corrosion, and more particularly, to a system and method for predicting the degree to which a tube array has degraded over a period of time due to corrosion in a particular operating environment.

Arrays of tubes can be found in a variety of industrial and process plants, where multiple sources, or mechanisms, of corrosion can attack the tubes, leading to deterioration and perforation. This problem is of particular concern in nuclear power plants, where nuclear steam generators, each containing upwards of a thousand tubes, can be subject to concurrent corrosion attacks on both primary (inner) and secondary (outer) tube surfaces. More so than in other industrial or process contexts, tube deterioration or failure in a nuclear steam generator, poses safety risks, in addition to performance (e.g., heat transfer) degradation. Moreover, excessive leakage resulting from failed tubes in the steam generator, can require the unscheduled shut-down of the power plant.

For these and other reasons, operators of power plants which employ nuclear steam generators, inspect and plug or repair tubes as necessary during cycle outages, to minimize total leakage during the next operating cycle. The prediction of which particular tubes in the array will be the next to fail, is virtually impossible. Because every tube cannot be inspected at every plant outage, yet the operator must be reasonably confident that the number of failures expected to occur during the next operating cycle will not result in the premature shut-down of the plant, efforts have been made to model, and therefore predict, the gross failure rates of tubes in the steam generator.

The failure rates of tubes in steam generators are typically computed using the so-called Weibull failure model, which takes the general form:

$$P_N(t) = 1 - \exp(-(t/a)^b) \qquad [1]$$

where:

$P_N(t)$=proportion failed at time (t) (failure mode N)

b=shape parameter of Weibull distribution a=scale parameter of Weibull distribution The total numbers of tubes requiring repair from N separate causes is obtained by Boolian summation involving risks associated with each failure mode. This process has proven adequate for cases in which the parameters b,a of each Weibull distribution are well known. The major deficiency in the existing methodology is the lack of a fully probabilistic method for dealing with large uncertainties in the values of the two Weibull parameters, and the subsequent inability to obtain quantifiable confidence estimates of the minimum and maximum tube repair requirements.

SUMMARY OF THE INVENTION

The present invention provides a system and method to permit a meaningful and quantifiable estimation of the uncertainties inherent in predictive modelling of corrosion failure in tube arrays.

In particular, the present invention utilizes a probabilistic model, preferably the so-called Monte Carlo simulation, combined with traditional failure models, such as the Weibull model, to generate a fully probabilistic index commensurate with the degree to which a tube array will degrade due to single or multiple corrosion sources.

In a system embodiment, the invention includes a computer platform having data processing means for performing arithmetic and logic operations on digitized data, data storage means, data input means, output means, for recording at least some of the results of the arithmetic and logic operations of the data processor means, and monitor means, for displaying data in response to the operation of the data processor means. The data storage means contains a stored computer program, which term is used in the broadest sense, to mean a series of statements or instructions usable directly by the processor means, for carrying out a sequence of logic and arithmetic operations. In this context, the stored computer program should be understood as including multiple individual programs or modules or routines of a single program that are linked together, i.e., modularized, even if the source code for such programs are in different languages. The computer platform and program together form a system which executes a corrosion failure prediction process. The functionality of this process can be described in terms of "functional modules" which each perform a particular function, but which can share hardware and program elements.

The computer program includes a first series of instructions for modelling the proportion of the tubes in the tube array, that fail at any time due to a particular source of corrosion. This first series of instructions includes at least one modelling parameter that has been treated as a constant conventionally, e.g., b and a when the failure model is of the Weibull type. A second series of instructions define a probabilistic model of uncertainties in the values of the failure model parameters, e.g., b and a of the Weibull model. Preferably, the second series of instructions is a Monte Carlo simulation. Additional series of instructions are provided in the computer program, for computing the distribution of the uncertainties in the number of tube failures at a given time, due to the probabilistic variation in the parameters.

The user of the system interacts therewith, through the data input means, for supplying instruction and operand data to the processor, and the monitor, on which the user sees information displayed in response to the operation of the data processor means. Preferably, the output means includes a printer or other media, e.g., "floppy" disc storage media, for recording at least some of the results of the arithmetic and logic operations of the data processor means.

The present invention thus provides two important advantages relative to the prior art. These include the ability to treat uncertainties in the failure model parameters, explicitly. Secondly, the invention provides the ability to display and record a distributional presentation of the results, with explicit confidence limits.

A method embodiment is also provided for generating an index commensurate with the degree to which a tube array degrades over a period of time due to corrosion in a particular operating environment. This comprises creating a data array defining the number of tubes in the tube array, a plurality of time points defining time intervals during which the degradation is to be assessed, and operating conditions that induce corrosion during each time interval. The expected degradation value of the array over each of a plurality of time points is computed using a deterministic failure model having at least one parameter that is assumed constant at each time point. For each time point and at least one parameter, a plurality of values of the parameter that deviate from the assumed constant value, are generated. For each time point, a plurality of degradation values are computed using the deterministic model with each of the said plurality of deviated values of the parameter, thereby defining a distribution of degradation values at the time point surrounding the expected degradation value at the time point. The final step is generating an index from the distribution of values, commensurate with the uncertainty at each time point, in the expected degradation value as computed by the deterministic model.

It should be understood that the term "degradation" or "failure" as used herein, does not necessarily denote loss of function or compromise in structural integrity or safety. Rather, these terms can be understood as denoting the presence of a non-through wall defect requiring attention or repair. In this context, the word "failure" is used primarily to preserve consistency with traditional usage in statistical and reliability technologies.

BRIEF DESCRIPTION OF THE DRAWINGS

FIG. 8 shows an input screen by which the operator can define each failure mode.

FIG. 9 shows the preferred input screen for problem set up and the definition of the simulation scenario.

DESCRIPTION OF THE PREFERRED EMBODIMENT

Figure 1:
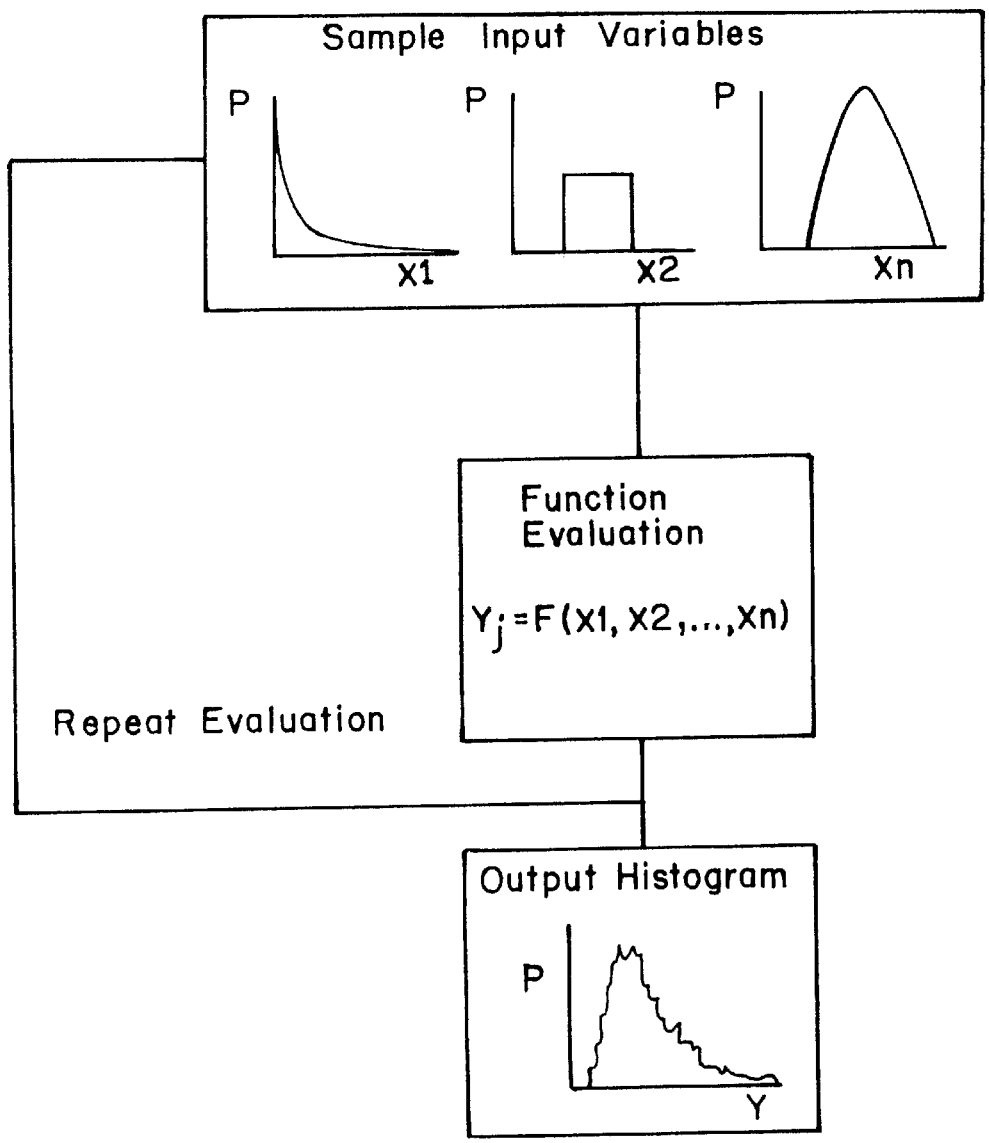
FIG. 1 is an overview of the Monte-Carlo simulation process of the present invention.

An important underlying failure mechanism in tubular members associated with nuclear power plants, is primary water stress corrosion cracking (PWSCC). This phenomenon has been widely observed in steam generator tube. Probabilistic models for steam generator tubing failure rates have been developed based on empirical data and are widely used within the nuclear industry. The methodology developed is robust with regard to the underlying failure model. See, for example, G. J. Hahn and S. S. Shapiro, *Statistical Models In Engineering*, John Wiley & Sons (1967) for a description of the Weibull model and J. A. Gorman et al "Statistical Analysis of Steam Generator Tube Degradation", EPRI NP-7493, September 1991 for a discussion of the Weibull model as used in steam generator tube corrosion analysis.

The Weibull model, although based on the statistics of past failures, is deterministic with respect to predicting future failures. According to the present invention, failure models which are deterministic with respect to failure prediction, are augmented with probabilistic features, thereby providing the two major advantages mentioned above, i.e., the explicit treatment of uncertainties in the failure model parameters, and the ability to display and record a distributional presentation of the results, with explicit confidence limits. Preferably, the probabilistic augmentation of conventional tube failure models, is achieved by incorporating a Monte-Carlo simulation.

The term Monte-Carlo method is widely used to describe any of an array of related probabilistic methods used to assess uncertainties in complex systems or processes. In some situations these methods are necessary to develop basic descriptive models for a class of problems known as stochastic processes in which the fundamental variables are random in nature. Monte-Carlo methods are a branch of experimental, as opposed to theoretical, mathematics specifically concerned with the behavior of random numbers. In direct Monte-Carlo simulation, the random numbers are chosen in such a way that they directly simulate a random physical process of interest. Monte-Carlo simulation methods have been used by the nuclear industry for many years to solve complex problems that were not tractable by other means, e.g., problems in neutron transport.

The relationship between the basic variables for which data exist and the output quantity of interest is generally governed by a set of models and correlations. Denoting the basic set of input variables by $X_i$, i=1,2 . . . . . N, where N is the total number of input variables, and the output quantity by Y, the relationship may be expressed as:

$$Y=f(X_1,X_2, \ldots ,X_N) \qquad [2]$$

If any $X_i$ is a random variable, then the output is also a random variable. Often, many or all of the input variables are random to some degree. In some instances a probabilistic relationship can exist between two input variables (covariance). For the purposes of stochastic simulation in the present invention, a constant in the prior art for which the exact value is unknown, is treated as a random variable.

The actual process implemented in a Monte-Carlo simulation is quite straight forward as shown schematically in FIG. 1. The process is essentially one of repeated sampling called trials. One trial consists of randomly sampling from the distributions representing each input variable. The complete set is then used to obtain one value of the output variable ($Y_j$) using the known function. The process is repeated many times resulting in an "experimental" distribution of the desired output quantity. This can be fit to a known analytical form or used directly to infer population characteristics such as quintiles.

The following discussion provides background on the types of mathematical models that are available for incorporation into the present invention, to obtain the expected failure rate given assumed future operating conditions associated with the tube array. The discussion begins with a simple model of stress corrosion cracking, and an example of how a Monte-Carlo simulation of a variable can be implemented, and concludes with a description of the preferred embodiment, wherein a Monte-Carlo simulation of an assumed constant parameter is implemented.

The following idealized system is useful in illustrating the application of Monte-Carlo simulation to primary water stress corrosion cracking (PWSCC) problems. Consider a system at constant temperature in which the deformation state is a known constant and elastic. The desired output is time to cracking which is functionally described by:

$$t = C\sigma_A^{-4} \quad [3]$$

where:

t = time to crack $\sigma_A$ = applied stress

C = empirical constant

In this idealized case, the applied stress is equal in magnitude to the yield strength which is a random variable assumed to be normally distributed with a population mean of 40 KSI and a standard deviation of 3 KSI. The constant (C) is assumed to have a value of 2E7 $(KSI)^4$. The resulting distribution of time to cracking is not normal and is in fact skewed to the left.

The progression of a stress corrosion crack in Alloy 600 is actually more complex, and likely consists of at least two distinct phases. The first is essentially microscopic and describes the initial development or initiation phenomena. The dimensional scale of this phenomenon is on the order of 4–8 grain diameters or approximately 80 um.

The second phase of the crack progression is macroscopic and describes the progression of a (presumably) detectable crack to an unacceptable dimension. The second phase of crack propagation is probably well described in terms of conventional fracture mechanics methods. The first phase appears to be governed by electrochemical processes and may itself consist of two parts.

These features of PWSCC suggest the need for a considerably more complex model than that given in Equation [3]. In terms of time to crack progression of a given depth, the model is given by:

$$t_D = f_1(A_1, A_2, \ldots, A_H; X_1, X_2, \ldots, X_N) + f_2(B_1, B_2, \ldots, B_J; Z_1, Z_2, \ldots, Z_K) \quad [4]$$

where:

$t_D$ = time for development of crack of depth D $f_1$ = initiation model(s) with M parameters and N variables $f_2$ = macroscopic crack propagation (fracture mechanics) model with J parameters and K variables $A_i$ = ith parameter (constant) in initiation model $X_i$ = ith variable in initiation model $B_i$ = ith parameter in macroscopic crack propagation model $Z_i$ = ith variable in macroscopic crack propagation model There is little doubt, that this information can result in a model of extreme complexity in which definition of the individual variables can require extensive computation for actual systems. There are, however, a considerable number of empirical time-to-failure models which have been used. The most important of these empirical models are the Exponential, Weibull, Log Normal and Gamma models, each of which is useful for systems having specific failure characteristics. It is important to note that the choice of model should be based on an understanding of the underlying failure mechanism and not merely on the predictive quality regarding available data.

The Exponential model is the simplest and most widely used time-to-failure model. This model plays a comparable role to that of the normal distribution in statistics. The time-to-failure is described by the cumulative distribution function:

$$f(t) = 1 - \exp(-t/\lambda) \quad [5]$$

where:

f(t) = fraction of population failed at time=t t = time $\lambda$ = parameter (failure rate)

In comparing models it is useful to consider the hazard function, which describes an instantaneous failure rate for a given model. Populations with constant hazard functions tend to exhibit a constant rate of failures with increased exposure. Populations with decreasing hazard functions tend to exhibit high initial failure rates followed by decreased rates with continued exposure. Components subject to PWSCC, such as steam generator tubes, are clearly subject to an increasing hazard function and exhibit increasing failure rates with exposure. The Exponential model is characterized by a constant hazard function which in fact is given by the single parameter ($\lambda$). This limitation makes the Exponential failure model a poor choice as a descriptive model for PWSCC related phenomena.

The Log Normal model for time-to-failure has been used with some success in the modelling of steam generator tube failures. Its usage can be somewhat justified on empirical grounds as an adequate descriptor of available data. The property of the Log Normal model which provides diverse representation of hazard on the time interval from zero to infinity makes this model useful for a variety of reliability studies. On a more theoretical basis, the Log Normal model is more appropriate to describe degree of deterioration than time-to-failure. An example of successful application of Log Normal failure models relate to transistors which tend to degrade gradually with continued exposure. The usage of a Log Normal model as a descriptor of PWSCC related failures is more justified on empirical than on theoretical grounds.

The Weibull model for time-to-failure has been successfully used to describe steam generator tube PWSCC failures. Unlike the Log Normal model, there exist a number of theoretical grounds for the use of a Weibull model to describe PWSCC related failures. The most significant of these is the basic extremal characteristic of the model as a "weak link" descriptor. The second is the ability of the Weibull model to achieve a diverse array of hazard functions. The time-to-failure for the Weibull model is described by the cumulative distribution function:

$$f(t) = 1 - \exp(-(t/a)^b) \quad [6]$$

where:

f(t) = fraction of population failed at time=t t = time b = shape parameter a = scale parameter The parameters of the Weibull model have physical significance. The scale parameter (a) is the exposure time at which 63% of the population at risk is expected to have failed. The shape parameter (b) has significance in terms of the hazard function. For b<1, the Weibull model has a decreasing hazard function. For b=1, the Weibull model becomes equivalent to the Exponential model. For b>1, the hazard rate increases with exposure, a situation typical of PWSCC and most other corrosion phenomena.

The most significant practical advantage of the Weibull model is the availability of a significant body of parameter information developed for special corrosion attack situations. A second advantage is the ability to correct for environmental changes by alteration of the scale parameter (b).

A Weibull model developed from experience with Alloy 600 steam generator tubing is preferred as the basal or parent distribution. The model is given by:

$$P(t) = 1 - \exp(-(t/a(F,L))^b) \quad [7]$$

where:

P(t)=fraction of population failed at time=t
b=shape parameter for PWSCC in steam generator tubes
a(F,L)=scale parameter for steam generator tubes with corrections for temperature (F) in degrees Fahrenheit and applied stress due to the location (L) of the tube in the tube array.

Figure 2:
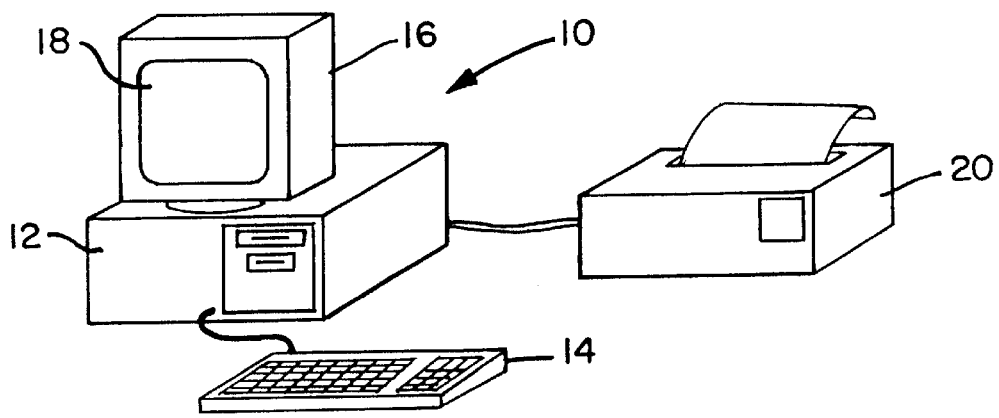
FIG. 2 is a depiction of the work station implementation of the present invention.

The present invention is preferably implemented in a work station system generally depicted in FIG. 2. Such work station has a combination of computer equipment or components which are configured to work together and define a computer platform 10. These components include a digital processing computer 12, a keyboard 14 or equivalent input device for the operator to communicate with the computer 12, a monitor 16 which includes a screen 18 on which the computer 12 presents information to the user as a result of the processes executed by the computer. Preferably, a printer 20 or other device is connected to the computer 12, for providing a permanent record of the results of the executed process.

Figure 3:
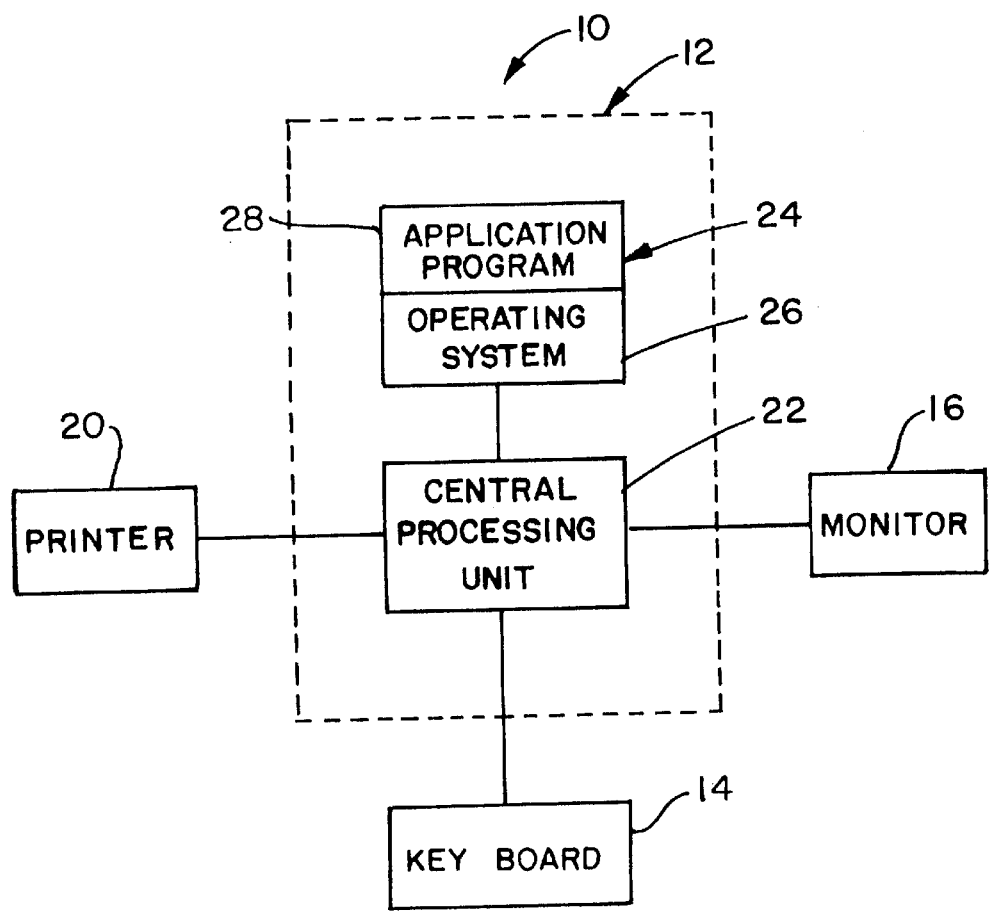
FIG. 3 provides a simplified representation of the functional aspects of the components of FIG. 2.

FIG. 3 provides a simplified representation of the functional aspects of the components shown in FIG. 2. The computer per se 12 can be viewed as having two main hardware elements, the central digital processing unit 22 (CPU), and the data storage, or memory unit 24. Those skilled in computer science know that the processing unit 22, can take a variety of forms, with multiple processors and the like, but the functionality thereof for performing arithmetic and logic operations on data, is adequately represented in FIG. 2. The memory 24 can also take a variety of physical forms, but during execution of the process performed by the computer system, at least an operating system program 26 and application programs 28 must reside in addressable memory locations.

As used herein, the term "data" should be understood in its most general way, to include machine readable information whether instructions, variables, operands, comments, or the like, and whether accessed by the CPU 22 from memory 24, from the keyboard 14, or through some other source. It should also be appreciated that the platform 10 for the present invention need not be limited to the "star" type of architecture shown in FIG. 3. For example, data entered at the keyboard 14 by the operator for storage in the memory 24, is first processed by the CPU 22 as shown in FIG. 3, but any auxiliary processing associated with such data entry step, would be equivalently encompassed by the system shown in FIG. 2.

The present invention will be described with respect to the user's objective of generating an observable or recordable confidence index or other figure of merit, associated with the expected degree to which a tube array in a nuclear steam generator will degrade from multiple corrosion sources, if the steam generator is operated according to a planned series of cycles. Those skilled in the art can appreciate the usefulness of the invention to address related specific objectives.

The application program 28 shown in FIG. 3, includes a first series of instructions for modelling the tube failure rate, i.e., the proportion of the tubes in the array that fail as a function of time due to a particular source of corrosion. This model can be any of the type represented by expressions [3]–[7] above, which have at least one constant or parameter, and in the preferred implementation of the Weibull model, two parameters, a and b as described above with respect to expression [6] or [7]. The Weibull parameters have conventionally been obtained in one of two ways. If the plant has had a substantial operating history, these parameters are empirically obtained from regression analysis of the history of actual failures. Alternatively, and generally for new plants, the Weibull parameters can be obtained from a reference library, such as the "Statistical Analysis of Steam Generator Tube Degradation" available from the Electric Power Research Institute as document EPRI-NP-7493 (September 1991). These parameters, regardless of the origin, are different for each source of corrosion, and may have other dependencies such as location dependent stress, as described above with respect to Equation [7]. For example, a bent portion of tube may have different parameters associated therewith, than a straight portion of tube.

Figure 4:
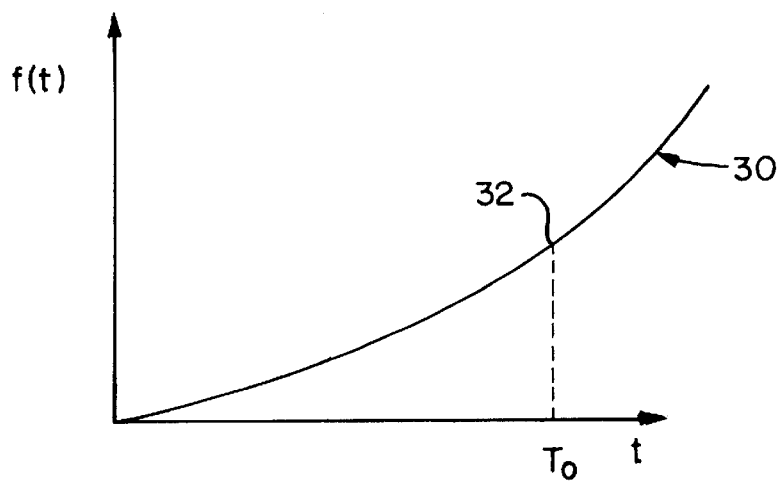
FIG. 4 is a graph of the best estimates of the number of tube failures versus time.

The best estimate of the total number of failed tubes from N separate causes is obtained in a conventional manner, by Boolian summation involving risks associated with each failure mode, as indicated in Equation [1]. FIG. 4 represents a graph 30, indicating the best estimates of the number of tube failures versus time f(t), such that a prediction can be made, of the number of tube failures 32 that will have occurred by time $t_o$. It should be understood that, alternatively, the same information could be expressed as a proportion of the original tubes that have failed, or the proportion of the original tubes that have not failed. These three functional outputs are equivalent and the use of one in the description that follows, should be understood as encompassing its equivalents.

Figure 5:
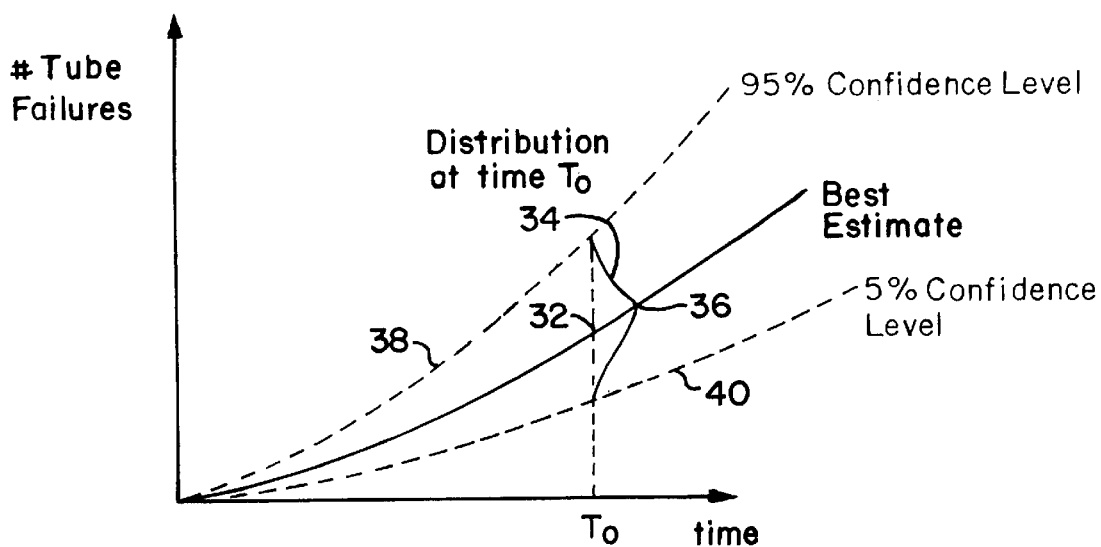
FIG. 5 is a graph of FIG. 4 including plotted confidence intervals.

In accordance with the present invention, a system and method are provided which refine the best estimate by an uncertainty index or figure of merit to account for the probability that the actual number of failures indicated along the curve 30 of FIG. 4, will be either greater or less. In other words, the curve 30 of FIG. 4 is to be viewed as merely a best estimate, or median value, which, at a given time such as $t_o$, has a quantifiable probability of being higher or lower than the median value. This is shown in FIG. 5 where, at time $t_o$, another curve 34 has been drawn with its peak 36 located above curve 30 at $t_o$, and falling off on either side. The reader should assume that this curve 34 extends vertically from the plane of the drawing, with the distance above the plane representing the probability that the number of failures are at the value of the intersection of a perpendicular line from the curve 34 to the plane. Two dotted lines 38,40 can then be drawn on the plane as shown in FIG. 5, representing for example, a 95% confidence level and a 5% confidence level, whereby one can conclude that at any time t, there is 95% confidence that the number of failures is less than indicated by curve 38.

The technique by which the present invention arrives at the more refined uncertainty figure of merit such as curve 38 shown in FIG. 5, relative to the conventional best estimate curves 30 shown in FIGS. 4 and 5, centers on considering the parameters of the failure rate model for generating the curve 30 of FIG. 4, as probabilistic variables, rather than constants. The probabilistic variation of each parameter can be inferred from the plant historical failure data, if such data was used for a regression analysis to obtain the failure rate model parameters in the first instance. In general, however, and in particular if one has used the standard library values of the parameters such as from the EPRI document referenced above, the invention treats the failure rate model parameters, as random variables which have the median value as listed in the library, but which have a deviation probability around the median.

Figure 6:
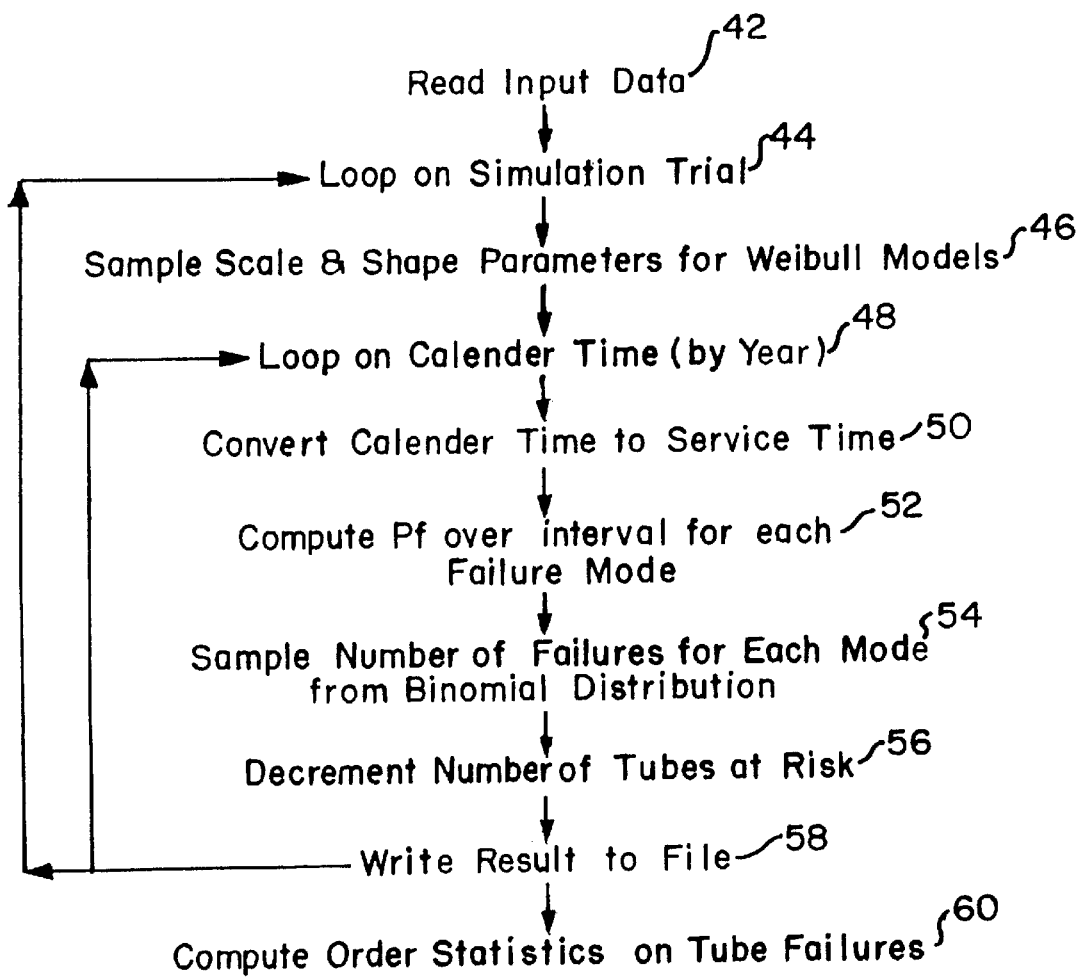
FIG. 6 is a flow chart indicating the method for implementing the present invention.

FIG. 6 is a flow chart indicating the method for implementing the present invention. This method will continue to be described in the context of the Weibull failure rate model which has two parameters a and b which instead of being assumed as constants, are considered median values, each having a probabilistic variation which in a preferred embodiment, can be assumed normal with a particular standard deviation.

As discussed above with respect to FIG. 4, the conventional failure model is utilized to obtain the best estimate curve, typically generated by executing a first set of program instructions for spaced apart time points defining a series of time intervals. The values as determined for each time interval provide a generally smooth curve such as shown at 30 in FIG. 4. For each of the time points used to generate the curve of FIG. 4, the following sequence of computations is performed in accordance with additional instructions stored in the applications program memory as shown in FIG. 3.

In the step of FIG. 6 indicated as 42, input data from memory is read, defining the information used at a particular time step from FIG. 4. In addition, a second set of instructions and data defining the probabilistic nature of the parameters are read, for each time point and source of corrosion N. As shown in step 44, a loop of simulation trials is performed, for each time point and each source of corrosion. At said time point and for said given source of corrosion, a third set of instructions provides at step 46, probabilistic sampling or modelling, preferably of the Monte-Carlo type described above, with respect to FIG. 1, whereby, in effect, hundreds of deterministic calculations using the first set of instructions (e.g., Weibull model) are each performed with parameter values that deviate from the constant value, in accordance with the probabilistic simulation technique that is employed. For example, for a Weibull model of Equation [6] having two parameters a,b, and a probabilistic characterization whereby each parameter has a particular standard deviation and an assumed normal distribution, the Monte-Carlo simulation will, via a random generator program of the type well known in the art, randomly select a particular deviated value of the parameter a and another particular deviated value of b, whereupon the Weibull model computation is made to arrive at a value of tube failure rate due to corrosion source N at a time t, that is different from that which would be obtained using Equation [6] in standard fashion.

As a result of step 46, hundreds of computations are made with Equation [6], at a particular time point for each source of corrosion N. The step 48 is then performed, whereby the time period is incremented based on calendar time, e.g., years. Because actual operating time, rather than calendar time, is determinant of failures, the calendar time is converted at step 50 to service time. In the subsequent step 52, the failure probability over the time interval between time points, is computed for each failure mode N. In the conventional manner, the number of failures due to each mode N is sampled from the binomial distribution at step 54.

In an optional feature which is preferred, the number of failures computed at 54 can be decremented by incorporating the results of periodic inspections or other information from, e.g., human intervention during the overall time period of interest in the prediction.

The results of the loop on simulation trial steps 44 through 56, are written to a file 58 which may be a sub-portion of the memory 24 shown in FIG. 3. When all of the simulations have been completed, a fourth series of instructions in the program portion of the memory, computes the order statistics which are represented by, for example, the curve 34 in FIG. 5. The user can specify how this information is to be utilized as an index or figure of merit, e.g., the user can select a fifth series of instructions to provide a figure of merit such as curve 38 of FIG. 5 representing 95% confidence that the number of tube failures will lie below the index.

This information can be displayed to the operator and would normally be printed for permanent viewing, and/or stored in digital memory in the computer system shown in FIG. 2, or on separate media which can be archived.

It should be further noted that in the Monte-Carlo technique, a random number generator program or program portion, in essence selects a deviation from the median value of the parameter, which has associated therewith a particular probability of occurrence based on, e.g., the normal distribution and standard deviation as specified for that particular parameter. The computation of the failure using the conventional failure rate model, i.e., Weibull model, is then recomputed using the deviated parameter values. Many such trials are performed, with the results of each new computation of the Weibull function recorded, whereby a histogram of failure rates versus time is obtained. This process is depicted in FIG. 1, where each of the three sample input variables represents the probability that a particular value of $X_1$, $X_2$, or $X_N$ will occur, wherein for our purposes, the X's represent the Weibull parameters. FIG. 1 shows that the probabilities P need not be normal functions. The Weibull function $Y_j$ is then evaluated for each trial and, after repetition many times, the output histogram of probability for each failure rate of the tube array can be generated.

Figure 7:
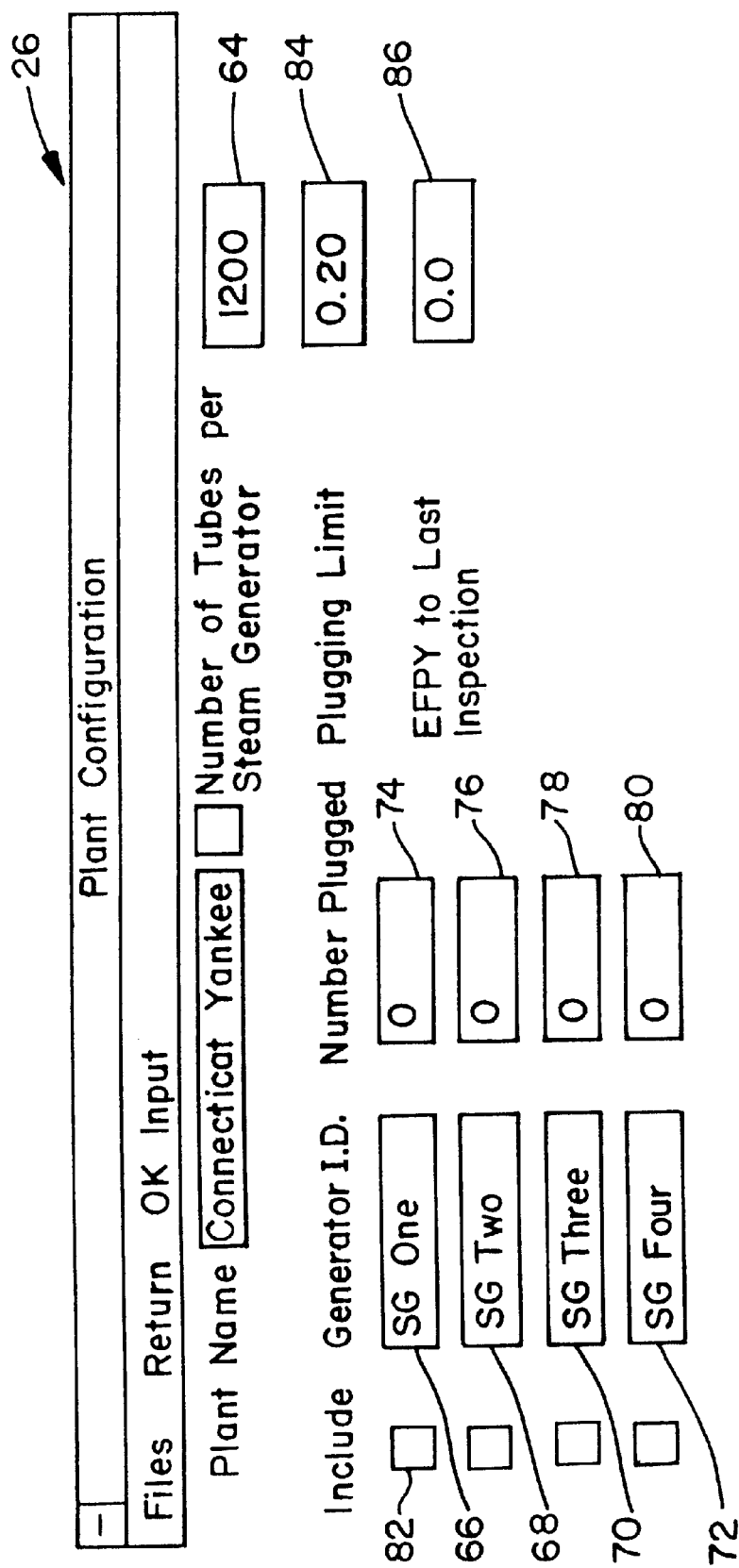
FIG. 7 shows an input screen by which the user specifies the plant configuration.

FIGS. 7 through 10 show the preferred form of the screen display and data entry fields associated with the invention. FIG. 7 shows a screen 62 by which the user specifies the plant configuration. Typically, the plant name will be entered at 64, but this is optional. The number of tubes per steam generator entered at 64 should be the as-fabricated number. Nuclear plants may have up to four steam generators, and the identification of each should be entered in the appropriate fields 66,68,70,72. Also, the number of tubes that have already been plugged for each steam generator, are entered in the corresponding fields 74,76,78,80. The program uses this information to determine the total number of tubes in the plant to analyze. An "x" entry can be made in each field such as 82 to the left of the generator identification fields, to indicate whether that generator is to be included in a particular evaluation. An entry can also be made in the plugging limit field 84 as a decimal (0–1.0), to represent the total fraction of tubes that can be taken out of service. This sets a limit on the number of plugging repairs that are permitted over the course of time. The operator can also enter into field 86, the time period expressed in terms of effective full power years (EFPY), to the last inspection.

FIG. 8 shows an input screen 88 by which the operator can define each failure mode. For failure mode No.1 as entered in fields 90,91, any name or description can be entered. The number of tubes affected by the failure mode is entered in field 92 for all steam generators under analysis up to the total number of functioning tubes in the plant. The activation energy for the failure mode damage mechanism is entered at field 94 and represents the Arrenhius energy in KCals/Mole degree Kelvin. The probability of detection by NDE field 96 calls for input of a decimal fraction representing the probability that a defect from this particular failure mode can be detected by non-destructive examination during inspection of the steam generator. The input to the fraction of defects requiring plugging field 98 sets the number of tubes taken out of service due to the failure mode. The remaining defective tubes are assumed to have been sleeved and therefore still functional. The fraction of defects leaking field input 100 sets the number of tubes that lose integrity due to the failure mode. This fraction is applied to the computed number of defects not found by the non-destructive examination. The remaining inputs set the parameters of the Weibull distribution model for the failure mode. Preferably, the Weibull distribution model has three parameters. The shape parameter is dimensionless, while the scale 104 and location 106 parameter inputs are in units of effective full power years of steam generator operation (EFPY). The standard deviation inputs 108, of the scale and shape parameters are in units of EFPY and scale, respectively. The failure mode specified on a given screen 88 can be selected for use in the analysis, by checking the indicated field 112.

FIG. 9 shows the preferred input screen 114 for problem set up and the definition of the simulation scenario. The user can enter the number of simulation trials, preferably within the range of 100–2,000 in field 116. The duration of the analysis in calendar time is entered for conversion into actual steam generator operating time. The number of fuel reload cycles entered at 118 would generally be in the range of between 2 and 40, and the basic characteristics of each cycle in terms of nominal cycle length in calendar years, a decimal fraction capacity factor, a steam generator hotleg operating temperature in degrees Fahrenheit, and the decimal fraction of tubes to be inspected during the end of cycle outage are entered at 120,122,124 and 126.

Figure 10:
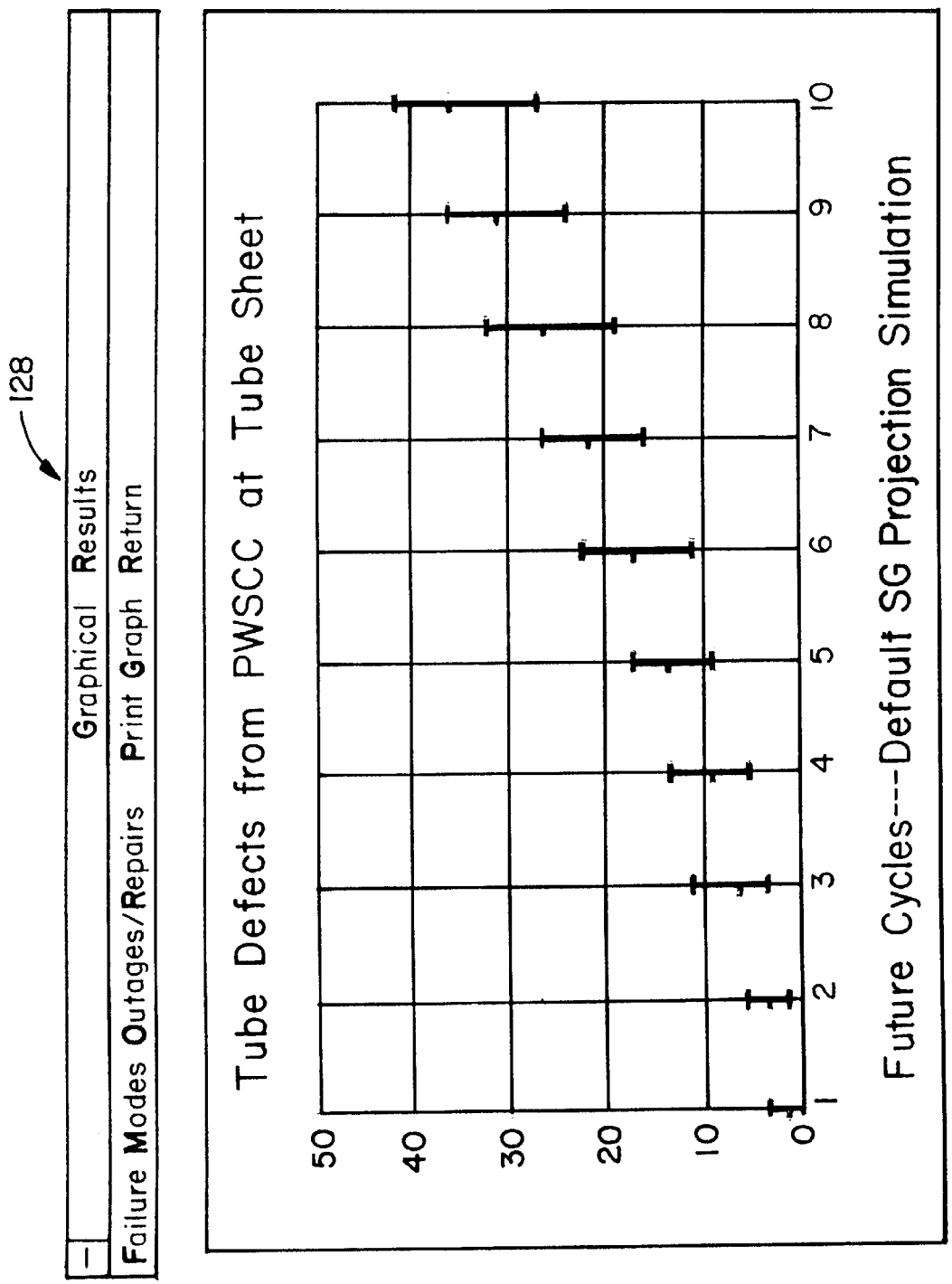
FIG. 10 represents a simplified form of output screen whereby the user can view the specific output of number of tube defects from the corrosion source mechanism of primary water side stress corrosion cracking, at the location of the tube sheet, for each of the future cycles.

FIG. 10 represents a simplified form of output screen display 128 from the invention, whereby the user can view the specific output of number of tube defects from the corrosion source mechanism of primary water side stress corrosion cracking, at the location of the tube sheet, for each of the future cycles 1 through 10. The horizontal tick mark 130 at each cycle indicates the median or best estimate number of tube defects expected at that cycle, based on the standard (i.e., constant) Weibull parameters for the specified corrosion source and location. The upper horizontal tick 132 and lower horizontal tick 134, specify the uncertainty associated with the median value, at for example, 95% and 5% confidence levels. Those skilled in the art could easily include instructions in the program, to display the horizontal ticks at some other level of confidence, i.e., one or two standard deviations from the median, etc.

It should be appreciated that the uncertainties are, in most instances, skewed about the median. This is a result of the Monte-Carlo portion of the simulations, which show that even if one assumes the deviation probability of a Weibull parameter about its median is normal, the deviation in failure rate about the median is not necessarily normal.

The screen display 18 on monitor 16 of FIG. 2, could likewise be selected or instructed via the keyboard 14, to display failure rate information in which all failure mechanisms are taken into account, such as in FIG. 6. Those skilled in the art will appreciate that, based on the input shown in the screen displays of FIGS. 7–10, and the methodology described in FIGS. 1 through 6, another set of program instructions can be stored in memory for generating a variety of desired output for viewing on the monitor 18 and/or otherwise providing a permanent record via printer 20 or magnetic media.

The apparatus and method embodiments of the present invention have been described from three perspectives, viz., the computer platform associated with FIGS. 2 and 3, the process steps associated with FIGS. 4–6, and the user action associated with FIGS. 7–10. These three aspects are, of course, intimately inter-related and, as is well known in the field of computer science, can be implemented using a variety of platforms, applications, program languages, operating systems and user interfaces.

Upon viewing the invention functionally as a computer system operable by a user for plotting or recording the probability of failure of tubes in a tube array due to corrosion over a series of future time intervals, these three aspects in essence define a plurality of functional modules. A first such module is for creating a data array defining the number of tubes in the tube array, a plurality of time points defining the time intervals during which the degradation is to be assessed, and operating conditions that induce corrosion during each time interval. A second functional module is provided for computing the expected degradation values of the tube array over a plurality of time points using a deterministic failure mode having at least one parameter that is assumed constant at each time point, such that the expected degradation values are a computed dependent variable with time as an independent variable. A third functional module provides for creating a data array in which the value of the failure model parameter at each time point is a probabilistic variable that deviates from the assumed constant value of the parameter at said time point. A fourth functional module is provided for computing a plurality of additional degradation values using the deterministic failure rate model at each of the time points, for each of the deviated values of the parameter, thereby generating a distribution of degradation values at the time point surrounding the expected degradation value of the time point. A fifth functional module is provided for generating a quantitative representation from the distribution of degradation values, commensurate with the uncertainty at each time point in the expected degradation value. A sixth functional module is provided for controlling the means for plotting, to plot the expected degradation value as a dependent variable against time as an independent variable as computed in the second functional module, and to plot the representation of the uncertainty in the expected values as another dependent variable against time as the independent variable (e.g., FIG. 6 or 10). Although all such functional modules are present in the preferred embodiment, they are not all absolutely necessary. For example, the sixth functional module for plotting, may be omitted, or substituted with a functional module for displaying, or a functional module for writing a data file for storage or archival purposes.

It should also be understood that, in the preferred embodiment, the conventional failure rate model is utilized along with the estimate of the constant parameter values, to explicitly calculate the best estimate of the failure rate for either a particular corrosion source, or for the combined effect of multiple corrosion sources. For example, the input screen in FIG. 8, calls for input of a specific scale parameter constant at 104 and shape parameter constant at 102. The probabilistic variable form of these parameters, is inferred by specifying a standard deviation with an assumed normal distribution, via fields 108 and 110. An alternative within the scope of the present invention, would be to omit the explicit input of a constant value of the scale parameter and shape parameter at 104,102, and instead enter additional data in fields such as 108 and 110, which establish a more complex probabilistic behavior of the parameters. In this embodiment, the expected value of the failure rate would not be computed initially based on the constant values of the scale and shape parameters, but would be computed only after the Monte-Carlo simulation.

In all embodiments, however, the inventive insight derives from recognizing that the parameters which have conventionally been deemed constants in the failure models, can instead be treated as probabilistic variables whether or not the mean, median or most probable value of the parameter, is known a priori.

What is claimed is:

1. A method for generating an index commensurate with a degree to which a tube array degrades over a period of time due to corrosion in a particular operating environment, comprising:

creating a data array defining a number of tubes in the tube array, a plurality of time points defining time intervals during which the degradation is to be assessed, and operating conditions that induce corrosion during each time interval;

computing an expected degradation value of the tube array over each of a plurality of time points using a deterministic failure model having at least one parameter that is assumed to have a constant value at each time point;

for each time point generating a plurality of values of said parameter that deviate from said assumed constant value;

for each time point, computing a plurality of degradation values using said deterministic failure model with each of said plurality of deviated values of said parameter, thereby defining a distribution of degradation values at said time point surrounding said expected degradation value at said time point; and generating an index from said distribution of degradation values, commensurate with an uncertainty at each time point, in said expected degradation value as computed by said deterministic failure model.

2. The method of claim 1, wherein the step of generating a plurality of values of said parameter includes generating a plurality of random values of said parameter.

3. The method of claim 2, wherein the step of generating a plurality of random values of said parameter includes a Monte-Carlo simulation.

4. The method of claim 1, wherein the step of generating a plurality of values of said parameter includes treating the parameter as a probabilistic variable.

5. The method of claim 1 further comprising the steps of inspecting plant steam generator tubes, measuring a failure rate of the tubes, and from the measured failure rates empirically determining said parameter for use in said deterministic failure model.

6. A method for generating an index commensurate with an uncertainty in a failure rate of tubes in a tube array, modelled in a computer system having a platform including, data processor means for performing arithmetic and logic operations on digitized data, data storage means coupled to the data processor means, for storing digitized data including instruction data and operand data, data input means for supplying instruction and operand data to the data processor means, output means for recording at least some of the results of the arithmetic and logic operations of the data processor means, and monitor means for displaying information in response to the operation of the data processor means, wherein said data storage means contains a stored computer program for mathematically modelling an expected failure rate of tubes in a tube array, said model including at least one assumed constant parameter for characterizing corrosion effects on the tubes, the method comprising:

with said data input means, creating a data array in said data storage means, defining a number of tubes in the tube array, a plurality of time points defining time intervals during which failures are to be modelled, and operating conditions that induce corrosion during each time interval, and defining said at least one assumed constant parameter as a random variable having characteristics stored in said data storage means;

with said program stored in said data storage means, for mathematically modelling the expected failure rate of tubes in a tube array, computing the expected failure rate of the tube array over a plurality of time points with said at least one assumed constant parameter, for each time point, generating a plurality of values of said parameter that deviate from said at least one assumed constant parameter according to the random variable characteristics as defined with said data input means, for each time point, computing a plurality of probabilistic failure rate values using said model with each of said plurality of deviated values of said parameter, thereby defining a distribution of probabilistic failure rate values at said time point surrounding said expected failure rate at said time point; and from said distribution of probabilistic failure rate values surrounding the expected failure rate, generating and displaying on said monitor means, an index commensurate with the uncertainty at each time point, in said expected failure rate.

7. The method of claim 6, including the step of initiating from said data input means, a delivery of said index as presented on said monitor means, to said output means, for creating a permanent record of the uncertainty associated with each expected failure rate.

8. The method of claim 6 wherein said generating and displaying step further comprises the step displaying each said expected failure rate and wherein said displaying of an index displays a range of said distribution of probabilistic failure rate values surrounding each said expected failure rate.

9. A system for generating an index commensurate with a degree to which a tube array in a nuclear steam generator has degraded from multiple corrosion sources, comprising:

a computer platform including data processor means for performing arithmetic and logic operations on digitized data, data storage means coupled to the data processor means, for storing digitized data including instruction data and operand data, data input means for supplying instruction and operand data to the data processor means, output means, for recording at least some of the results of the arithmetic and logic operations of the data processor means, and monitor means, for displaying information in response to the operation of the data processor means;

said data storage means containing a stored computer program including, a first modelling means for modelling a number of tubes in said tube array, that fail with the passage of time due to a particular source of corrosion, said modelling means comprising a first series of instructions for defining a combination of inter-connected circuit elements and including at least one corrosion related parameter that is assumed to have a constant value, a second modelling means defining a probabilistic model of deviation of each of said parameters, from the assumed constant value of the parameter, said second modelling means comprising a second series of instructions for defining a combination of inter-connected circuit elements, execution means for executing said first modelling means with said parameter assumed to have a constant value and repeating execution of said first modelling means with said parameter deviated probabilistically from said assumed constant value, as generated by said second modelling means, said execution means comprising a third series of instructions for defining a combination of inter-connected circuit elements, storing means for storing a probability distribution of the number of failed tubes as dependent on said probabilistic deviation of said parameter about the assumed constant value of the parameter, said storing means comprising a fourth series of instructions for defining a combination of inter-connected circuit elements, and computing means for computing and displaying an uncertainty index commensurate with the probability distribution stored in said storing means.

10. A computerized system for plotting a probability of failure of tubes in a tube array due to corrosion over a series of future time intervals comprising a computer platform including a central processing unit, data storage means, a user interface, means for plotting a quantitative relationship between an independent variable and a dependent variable, and computer program means stored in said computer platform and defining instructions for executing digitized processes under control of said processing unit, wherein said computer platform and computer program means define a plurality of functional modules including:

a first functional module, for creating a data array defining a number of tubes in the tube array, a plurality of time points defining said time intervals during which degradation is to be assessed, and operating conditions that induce corrosion during each time interval, said first functional module comprising a first series of instructions for defining a combination of inter-connected circuit elements, a second functional module, for computing expected degradation values of the tube array over a plurality of time points using a deterministic failure model having at least one parameter that is assumed to have a constant value at each time point, such that said expected degradation values are a computed dependent variable with time as an independent variable, said second functional module comprising a second series of instructions for defining a combination of inter-connected circuit elements, a third functional module for creating a data array in which the assumed constant value of said parameter at each time point is a probabilistic variable that deviates probabilistically from said assumed constant value at said time point, said third functional module comprising a third series of instructions for defining a combination of inter-connected circuit elements, a fourth functional module for computing a plurality of additional degradation values using said deterministic failure model at each of said time point, for each of said deviated value of the parameter, thereby generating a distribution of degradation values at said time point surrounding said expected degradation value at said time point, said fourth functional module comprising a fourth series of instructions for defining a combination of inter-connected circuit elements, a fifth functional module for generating a quantitative representation from said distribution, commensurate with an uncertainty at each time point in said expected degradation value, said fifth functional module comprising a fifth series of instructions for defining a combination of inter-connected circuit elements, and a sixth functional module for controlling said means for plotting, to plot the expected degradation value as a dependent variable against time as an independent variable as computed in said second functional module, and to plot said representation of the uncertainty in said expected degradation values as another dependent variable against time as the independent variable, said sixth functional module comprising a sixth series of instructions for defining a combination of inter-connected circuit elements.

\* \* \* \* \*